United States Patent
Salmen

(10) Patent No.: US 7,069,275 B2
(45) Date of Patent: Jun. 27, 2006

(54) METHOD AND APPARATUS FOR RESTRICTED RUN-TIME ENVIRONMENT WITH DYNAMIC USER CONTEXT

(75) Inventor: Helmut Salmen, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 488 days.

(21) Appl. No.: 10/223,779

(22) Filed: Aug. 19, 2002

(65) Prior Publication Data

US 2004/0034623 A1  Feb. 19, 2004

(51) Int. Cl.
*G06F 12/00* (2006.01)

(52) U.S. Cl. .......................... 707/200; 707/9; 707/10; 707/201; 707/205; 709/219; 709/228

(58) Field of Classification Search .................. 707/9, 707/10, 200, 201, 205; 709/219, 228
See application file for complete search history.

(56) References Cited

U.S. PATENT DOCUMENTS

| | | | | |
|---|---|---|---|---|
| 5,903,732 A | * | 5/1999 | Reed et al. | 709/229 |
| 6,618,743 B1 | * | 9/2003 | Bennett | 718/104 |
| 2002/0095479 A1 | * | 7/2002 | Schmidt | 709/218 |

OTHER PUBLICATIONS

Vassilis Prevelakis and Diomidis Spinellis. "Sandboxing Applications". USENIX 2001 Technical Conference Proceedings: FreeNIX Track, Berkeley, CA, Jun. 2001. Usenix Association , pp. 1-8.*

Smith, R.E., "Mandatory protection for Internet Server Software", Computer Security Applications Conference, Dec. 9-13, 1996, pp. 178-184.*

* cited by examiner

*Primary Examiner*—Khanh B. Pham
(74) *Attorney, Agent, or Firm*—Martine Penilla & Genecarella LLP

(57) ABSTRACT

Embodiments of the present invention are directed to a method and apparatus for restricted run-time environment with dynamic user context. In one embodiment, a user interacts with the computer system through a restricted run-time environment. When the user begins using the computer system at a local machine (i.e., a client), a user context is dynamically created at the local machine. Then, a user interface is initiated in the run-time environment which is isolated from the local machine's system files. In one embodiment, the user interface and all actions resulting from interaction through the interface take place in the isolated run-time environment. In one embodiment, the isolated run-time environment contains its own set of system files that the user may need to access. In one embodiment, the local machine is running the Unix™ operating system. A user interacts with the system through an interface running from the chroot directory.

26 Claims, 14 Drawing Sheets

METHOD AND APPARATUS FOR RESTRICTED RUN-TIME ENVIRONMENT WITH DYNAMIC USER CONTEXT

BACKGROUND OF THE INVENTION

1. Field of the Invention

The present invention relates to the field of computer user interfaces and, in particular, to a method and apparatus for restricted run-time environment with dynamic user context.

Sun, Sun Microsystems, the Sun logo, Solaris and all Java-based trademarks and logos are trademarks or registered trademarks of Sun Microsystems, Inc., in the United States and other countries. All SPARC trademarks are used under license and are trademarks of SPARC International, Inc., in the United States and other countries. Products bearing SPARC trademarks are based upon an architecture developed by Sun Microsystems, Inc.

2. Background Art

In some computer systems (e.g., thin client architectures) much of a user's data and computation is maintained and performed at a remote location using a server computer. When all of the data or computation necessary for a user's task is handled by a server, the user may easily interact with the system at different locations using different client computing devices. However, some applications require or prefer some data or computation to be handled at the client computer. Using prior art methods, the client's system data is vulnerable to tampering by a malicious user. Before further discussing the drawbacks of current schemes, it is instructive to discuss a computer architecture where this problem occurs.

Multi-Tier Application Architecture

In the multi-tier application architecture, a client communicates, for example, requests to a server for data, software and services, and the server responds to the requests. The server's response may entail communication with a database management system for the storage and retrieval of data.

The multi-tier architecture includes at least a database tier that includes a database server; an application tier that includes an application server and application logic (i.e., software application programs, functions, etc.); and a client tier. The data base server responds to application requests received from the client. The application server forwards data requests to the database server.

FIG. 1 provides an overview of a multi-tier architecture. Client tier 100 typically consists of a computer system that provides graphic user interface (GUI) generated by a client 110, such as a browser or other user interface application. Conventional browsers include Internet Explorer and Netscape Navigator, among others. Client 110 generates a display from, for example, a specification of GUI elements (e.g., a file containing input, form, and text elements defined using the Hypertext Markup Language (HTML)) and/or from an applet (i.e., a program written in the Java™ programming language or another platform independent programming language which runs when it is loaded by the browser).

Further application functionality is provided by application logic managed by an application server 120 in application tier 130. The apportionment of application functionality between client tier 100 and application tier 130 is dependent upon whether a "thin client" or a "thick client" topology is desired. In a thin client topology, the client tier (i.e., the end user's computer) is used primarily to display output and obtain input while the computing takes place in other tiers. On the other hand, a thick client topology uses a more conventional, general purpose computer which has processing, memory, and data storage abilities. Database tier 140 contains the data that is accessed by the application logic in application tier 130. Database server 150 manages the data and/or its structure, as well as the operations that can be performed on the data and/or its structure.

Application server 120 can include applications such as a corporation's scheduling, accounting, personnel and payroll applications. Application server 120 manages requests for the applications that are stored therein. Application server 120 can also manage the storage and dissemination of production versions of application logic. Database server 150 manages the database(s) that manage data for applications. For example, database server 150 responds to requests to access the scheduling, accounting, personnel and payroll applications' data.

Connection 160 is used to transmit data between client tier 100 and application tier 130, and may also be used to transfer the application logic to client tier 100. The client tier can communicate with the application tier via, for example, a Remote Method Invocator (RMI) application programming interface (API) available from Sun Microsystems™. The RMT API provides the ability to invoke methods, or software modules, that reside on another computer system. Parameters are packaged and unpackaged for transmittal to and from the client tier. Connection 170 between application server 120 and database server 150 represents the transmission of requests for data and the responses to such requests from applications that reside in application server 120.

Elements of the client tier, the application tier and the database tier (e.g., client 110, application server 120 and database server 150) may execute within a single computer. However, in a typical system, elements of the client tier, the application tier and the database tier may execute within separate computers interconnected over a network such as a LAN (local area network) or WAN (wide area network).

Local Machine System Security

If all of the user's data and computation (task) is handled at the remote location, the user will not need to create any files or modify any existing files on the client. Thus, in such a system, the user often is prevented from creating or modifying local files, which prevents a malicious user from damaging the local machine's system information, yet, still enables full use of the system. However, if some user task requires that the user be able to create or modify a local file, in prior art methods, a malicious user may be able to modify and damage the local machine's system information (i.e., the system information in the client tier). Thus, a need exists to allow a user to create or modify a local file while preventing a malicious user from modifying or damaging the local machine's system information.

SUMMARY OF THE INVENTION

Embodiments of the present invention are directed to a method and apparatus for restricted run-time environment with dynamic user context. In one embodiment of the present invention, a user interacts with the computer system through a restricted run-time environment. When the user begins using the computer system at a local machine (i.e., a client), a user context is dynamically created at the local machine. Then, a user interface is initiated in the run-time environment which is isolated from the local machine's system files.

In one embodiment, the user interface and all actions resulting therefrom occurs in the isolated run-time environment. In one embodiment, the isolated run-time environment contains its own set of system files available for user access.

In one embodiment, the local machine is running the Unix™ operating system. A user interacts with the system through an interface running from the chroot directory. All actions initiated by the interface also run from a chroot directory. Thus, a malicious user is unable to tamper with the local machine's system files.

In one embodiment, the user interface requires a local user context. Before the user interface is initiated, the local user context is dynamically generated for the user. In one embodiment, some of the user context data is downloaded from the system to the local machine and incorporated in the local user context. In another embodiment, the local machine contains default user context data. The default user context data is incorporated in the local user context. In one embodiment, if the system is unavailable, a default local user context is generated from the default user context data.

In one embodiment, the user may persistently alter a portion of the user context data from the system. After the context data is altered, the altered data is uploaded to the system. In another embodiment, the user may temporarily alter a portion of the default user context data on the local machine. When the user stops using the system (e.g., logs out), the temporary alterations are lost and the default user context data is restored. In another embodiment, the user is prevented from altering some portions of the user context.

In one embodiment, the user interface is a web browser (e.g., Netscape). The user displays standard web content using the web browser. In one embodiment, the user uses applets to adapt to changing needs. In one embodiment, the web browser initiates helper applications to perform specific tasks (e.g., scripting, Java virtual machine, image output, video output or audio output).

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for restricted run-time environment with dynamic user context. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Restricted Run-Time Environment

In one embodiment of the present invention, a user interacts with the computer system (e.g., a system having a multi-tier application architecture) through a restricted run-time environment. When the user begins using the computer system at a local machine (i.e., a client and/or a simple local server, such as a Sunray server that only executes a browser for a thin client and/or a plurality of thin clients), a user context is dynamically created at the local machine. Then, the user interface is initiated in a run-time environment, which is isolated from the local machine's system files.

In one embodiment, the user context for the user can be dynamically created from a preset pool of available user contexts. Every time the user initiates the use of the system, an available user context is selected for that user and every time that user has completed the use of the system, the user context is put back into the pool to be later reused by that user and/or another user. The user context may include preference information, such as font settings, and/or protection information, such as where a user can create files, what files a user can access, and/or where the user can access the files.

Figure 1:
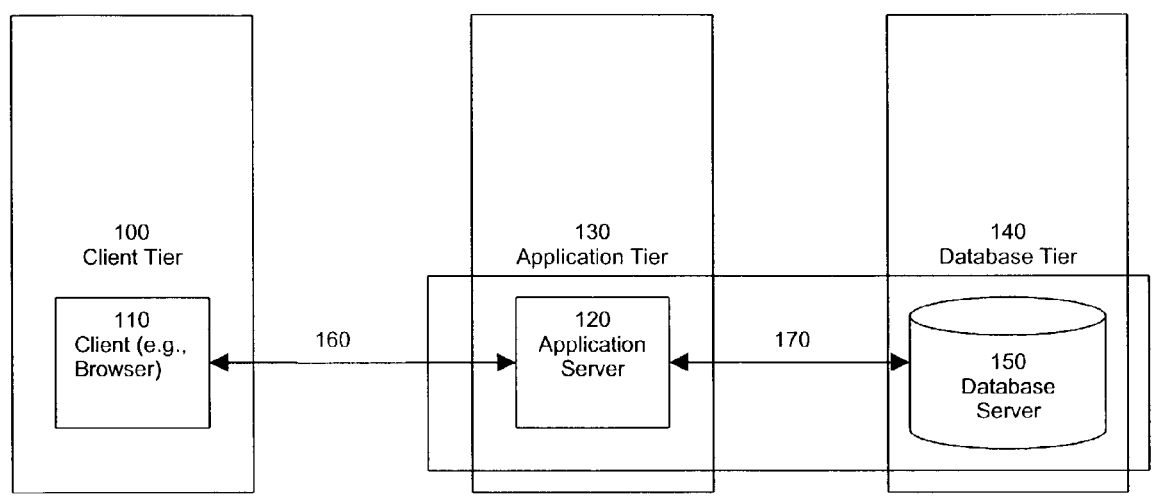
FIG. 1 is a block diagram of a multi-tier architecture.
Figure 2:
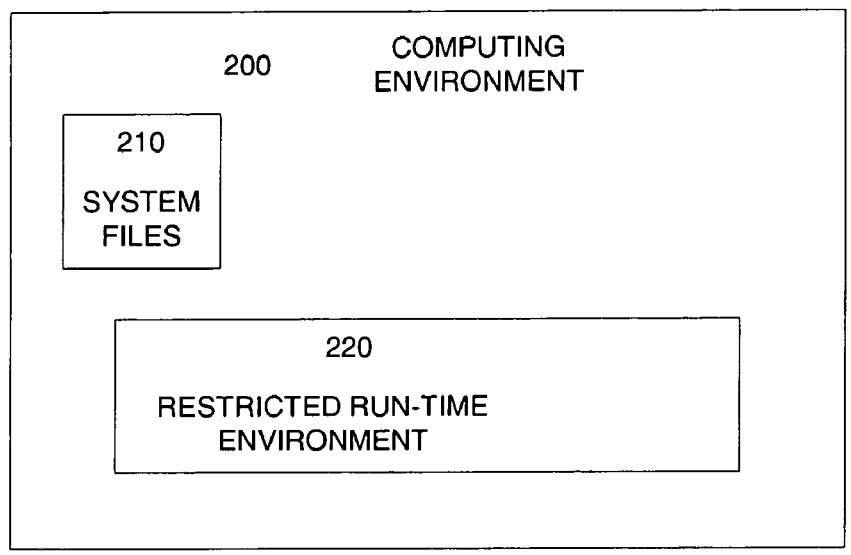
FIG. 2 is a block diagram of the computing environment of a local machine in accordance with one embodiment of the present invention.

FIG. 2 illustrates the computing environment of a local machine in accordance with one embodiment of the present invention. The computing environment 200 of the local machine contains system files 210 and a restricted run-time environment 220 which is isolated from the system files.

Figure 3:
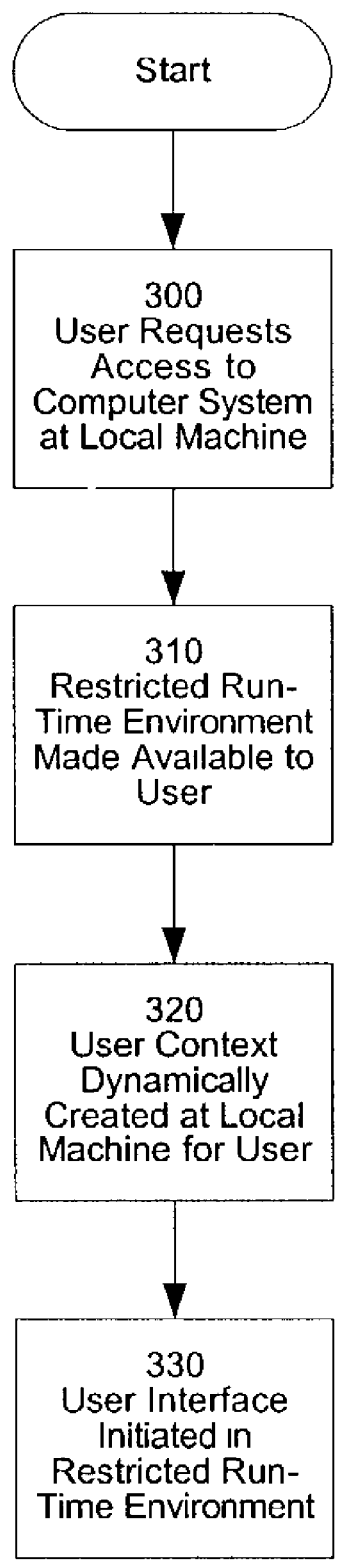
FIG. 3 is a flow diagram of the process of user interaction with a computer system in accordance with one embodiment of the present invention.

FIG. 3 illustrates the process of user interaction with a computer system in accordance with one embodiment of the present invention. At block 300, a user requests access to the computer system at a local machine. At block 310, a restricted run-time environment is made available to the user. Processes (e.g., executing a first program on behalf of the user) initiated in the restricted run-time environment and all processes spawned by processes initiated in the restricted run-time environment (e.g., executing one or more other programs on behalf of the first program) do not have access to anything outside the restricted run-time environment.

At block 320, a user context is dynamically created at the local machine for the user. At block 330, a user interface (e.g., a browser) is initiated in the restricted run-time environment. Since the user interface is initiated in the restricted run-time environment, the user will not be able to tamper with the local machine's system files, which are maintained outside the restricted run-time environment.

In one embodiment, the user interface and all actions resulting from interaction through the interface take place in the isolated run-time environment. In one embodiment, the restricted (or isolated) run-time environment contains its own set of system files the user may need to access. Thus, system files in the restricted run-time environment may be upgraded for the user without altering a stable set of system files used by the local machine.

Figure 4:
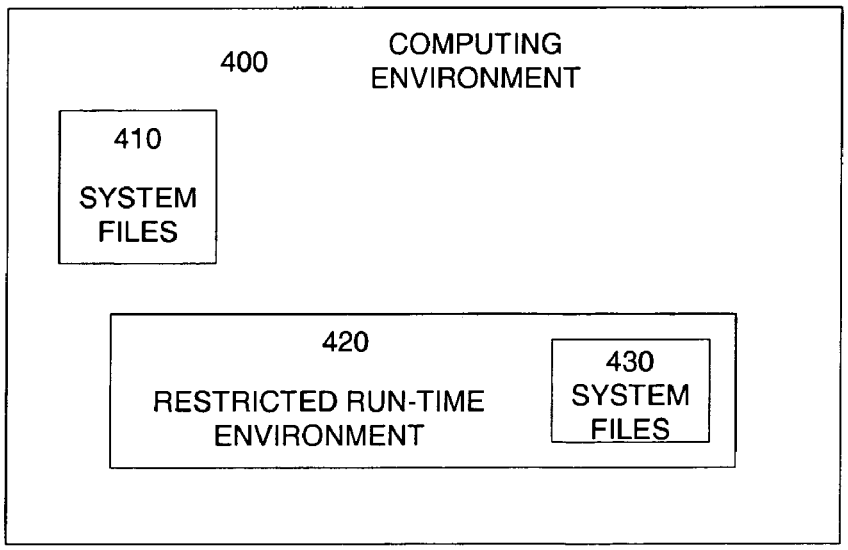
FIG. 4 is a block diagram of the computing environment of a local machine with a restricted run-time environment containing system files in accordance with one embodiment of the present invention.

FIG. 4 illustrates the computing environment of a local machine with a restricted run-time environment containing system files in accordance with one embodiment of the present invention. The computing environment 400 of the local machine contains system files 410 which are maintained in isolation from a restricted run-time environment 420. The restricted run-time environment contains its own set of system files 430 that a user may need to access.

Figure 5:
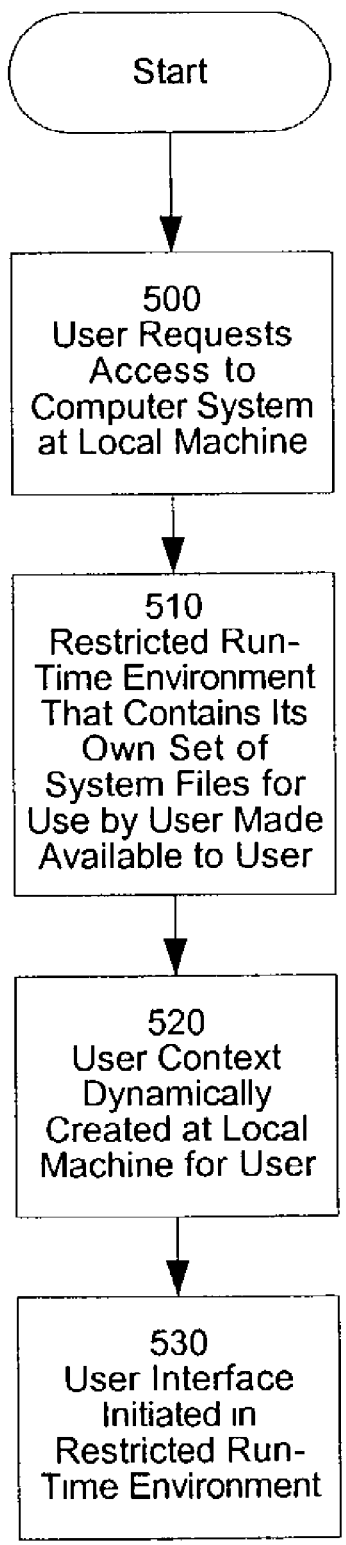
FIG. 5 is a flow diagram of the process of user interaction with a computer system wherein a restricted run-time environment contains its own set of system files in accordance with one embodiment of the present invention.

FIG. 5 illustrates the process of user interaction with a computer system wherein a restricted run-time environment contains its own set of system files in accordance with one embodiment of the present invention. At block 500, a user requests access to the computer system at a local machine. At block 510, a restricted run-time environment that contains its own set of system files for use by the user is made available to the user. Processes initiated in the restricted run-time environment and all processes spawned by processes initiated in the restricted run-time environment do not have access to anything outside the restricted run-time environment.

At block 520, a user context is dynamically created at the local machine (i.e., the client tire) for the user. At block 530, a user interface is initiated in the restricted run-time environment. Since the user interface is initiated in the restricted run-time environment, the user will not be able to tamper with the local machine's system files, which are maintained outside the restricted run-time environment. The system files contained in the restricted run-time environment are still at potential risk of user tampering.

Chroot Environment

In one embodiment, the local machine is running the Unix™ operating system. A user interacts with the system through an interface running from a chroot (or change root) directory. All actions initiated by the interface also run from the chroot directory. The chroot directory (or environment) is an alternate root directory that appears as the root directory for a given process or set of processes. Thus, a malicious user is unable to tamper with the local machine's system files in the main directory because the user is confined to the directory tree below the chroot directory (i.e., the user only has access to files stored in the directory tree below the chroot directory).

Figure 6:
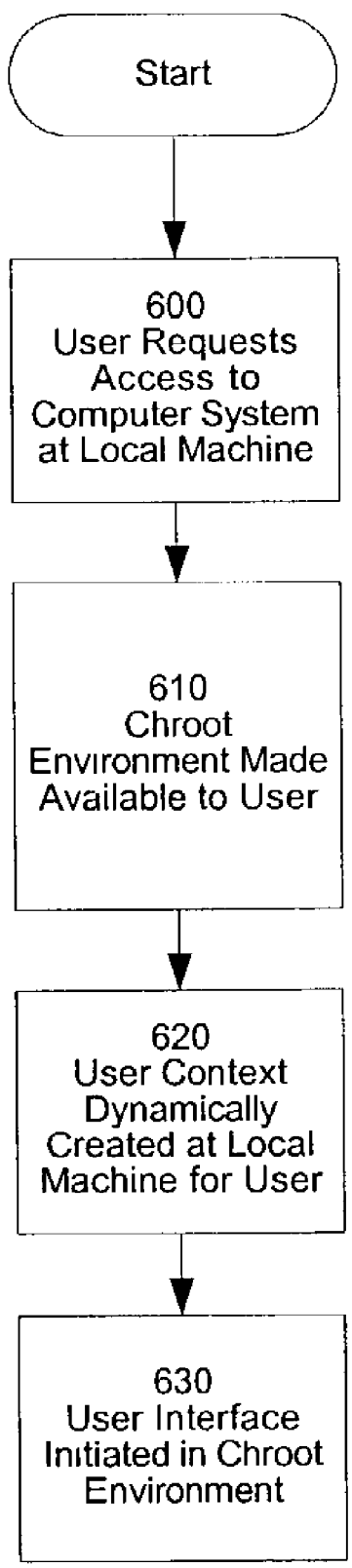
FIG. 6 is a flow diagram of the process of user interaction with a computer system through a local machine running a Unix operating system in accordance with one embodiment of the present invention.

FIG. 6 illustrates the process of user interaction with a computer system through a local machine running a Unix operating system in accordance with one embodiment of the present invention. At block 600, a user requests access to the computer system at the local machine. At block 610, the chroot environment (or directory) is made available to the user. The chroot environment is a restricted run-time environment; processes initiated in the chroot environment and all processes spawned thereby do not have access to anything outside the chroot environment.

At block 620, a user context is dynamically created at the local machine for the user. At block 630, a user interface is initiated in the chroot environment. Since the user interface is initiated in the chroot environment, the user will not be able to tamper with the local machine's system files, which are maintained outside the chroot environment. However, the system files contained in the chroot environment are used by the user and remain at risk for user tampering.

In one embodiment, all users of a local machine share a single chroot environment. Protection within the chroot environment is provided (only) by the standard Unix user semantics. Use of the chroot environment provides greater protection for the system resources outside of the chroot environment.

Figure 7:
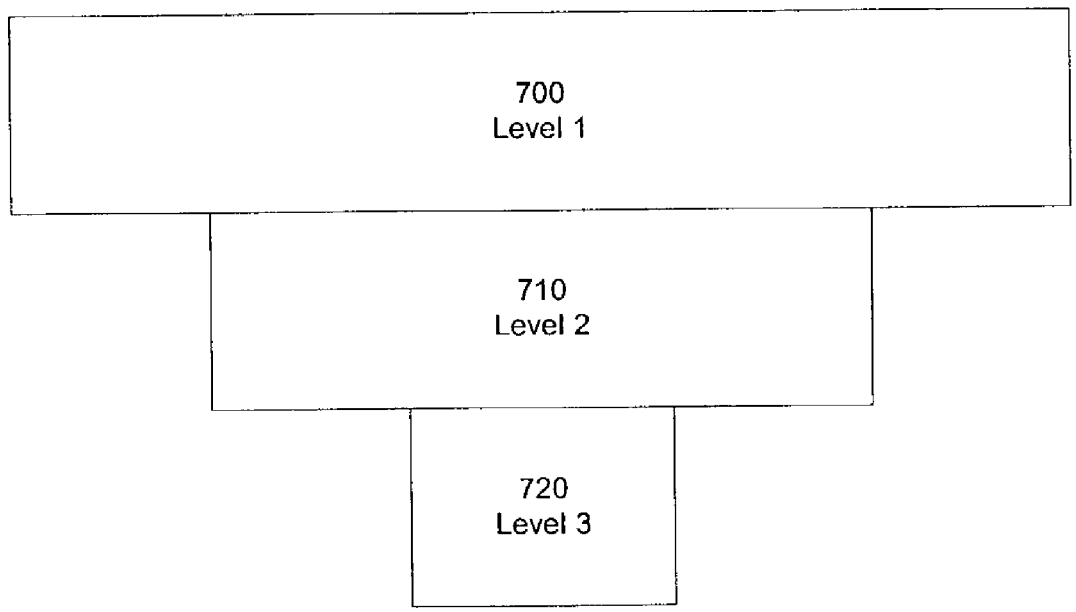
FIG. 7 is a block diagram of a three level protection scheme for a local machine in accordance with one embodiment of the present invention.

FIG. 7 illustrates a three-level protection scheme for a local machine in accordance with one embodiment of the present invention. At level one 700, execution is done with root permission. A script for initiating a user session (e.g., bbrootsession) is run with level one permission to create or assign a new Unix user ID, userX (e.g., user0), and to set up everything this user needs to run in the chroot environment.

A second script for putting the user in the level two 710 (e.g., bbcontrol) is then executed (with the new user permissions set up in level one 700). At this level 710, execution is done in the root file system with the newly created or assigned userX permission (e.g., user0 permission or user-specific permission) rather than the root permission. In addition, scripts for supporting and/or monitoring (e.g., bbstartd) are started, and a script for stating the browser (e.g., bbstartbrowser) is started as a background process. The supporting and/or monitoring scripts should reside outside the chroot environment but should perform the supporting and/or monitoring tasks for the chroot environment. The window manager (wm) is also initiated at this permission level 710 and does not terminate until the user (e.g., user0) logs out of the webtop.

The execution then switches to the level three protection scheme. Level three 720 is the level for user applications. The window manager (wm), the browser, and any application(s) (defined and/or available in the chroot environment) that the window manager and/or the browser spawn (or start) run with level three permission (e.g., a user application-specific permission) in the chroot environment. Thus, the user applications use the system files provided within the chroot environment without access to the root system files in the environment used by the local machine.

In addition to increased security, the reason for using the three-level scheme is to provide for easy cleaning or evicting of user-related information when a user exits from the system. For example, on exit of a session the system only has to scan the process table for processes associated with user ids, userX (e.g., user0), and evict them.

The cleaning/evicting of user-related information should be the last step in a user session (i.e., in the bbrootsession script). As a default, no processes with the specific user IDs, userX (e.g., user0), should remain after userX has exited from the system. An optional script for running tasks on the system may be provided to allow certain user-specific information to remain on the system after the user has exited.

Dynamic User Context

Figure 8:
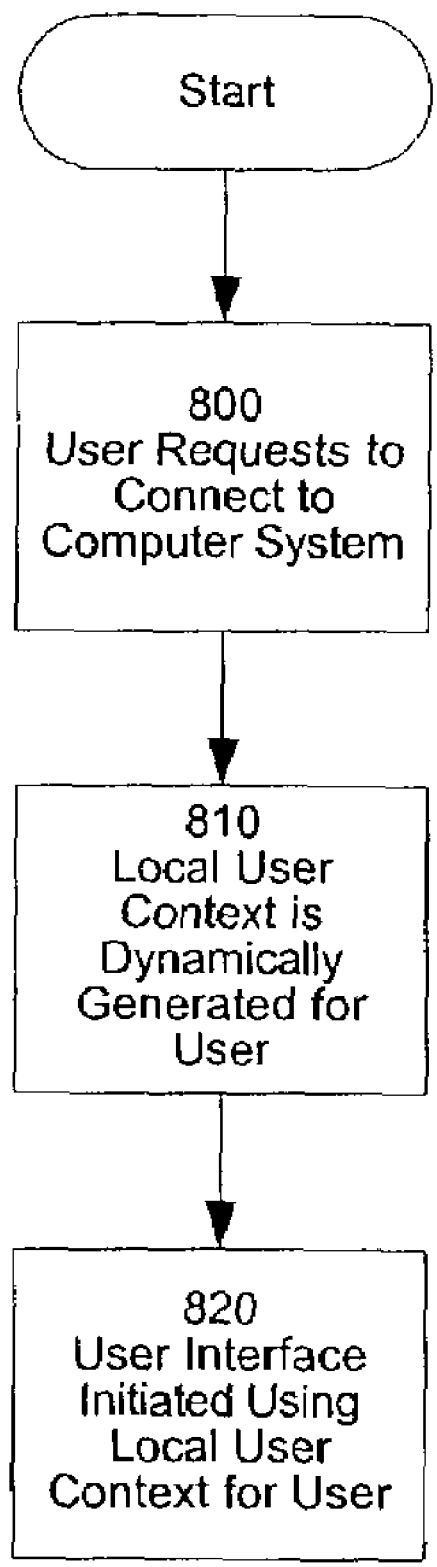
FIG. 8 is a flow diagram of the process of initiating a user interface in accordance with one embodiment of the present invention.

In one embodiment, the user interface requires a local user context. Before the user interface is initiated, a local user context is dynamically generated for the user (i.e., automatically selected from a preset pool of reserved user contexts). FIG. 8 illustrates the process of initiating a user interface in accordance with one embodiment of the present invention. At block 800, a user requests to connect to a computer system. At block 810, a local user context is dynamically generated for the user. The local user context may include preferences such as font settings. At block 820, a user interface is initiated using the local user context for the user.

In one embodiment, some of the user context data is downloaded from the system to the local machine and incorporated in the local user context. In another embodiment, the local machine contains default user context data. The default user context data is incorporated in the local user context. In one embodiment, if the user context data on the system is unavailable, a default local user context is generated from the default user context data.

Figure 9:
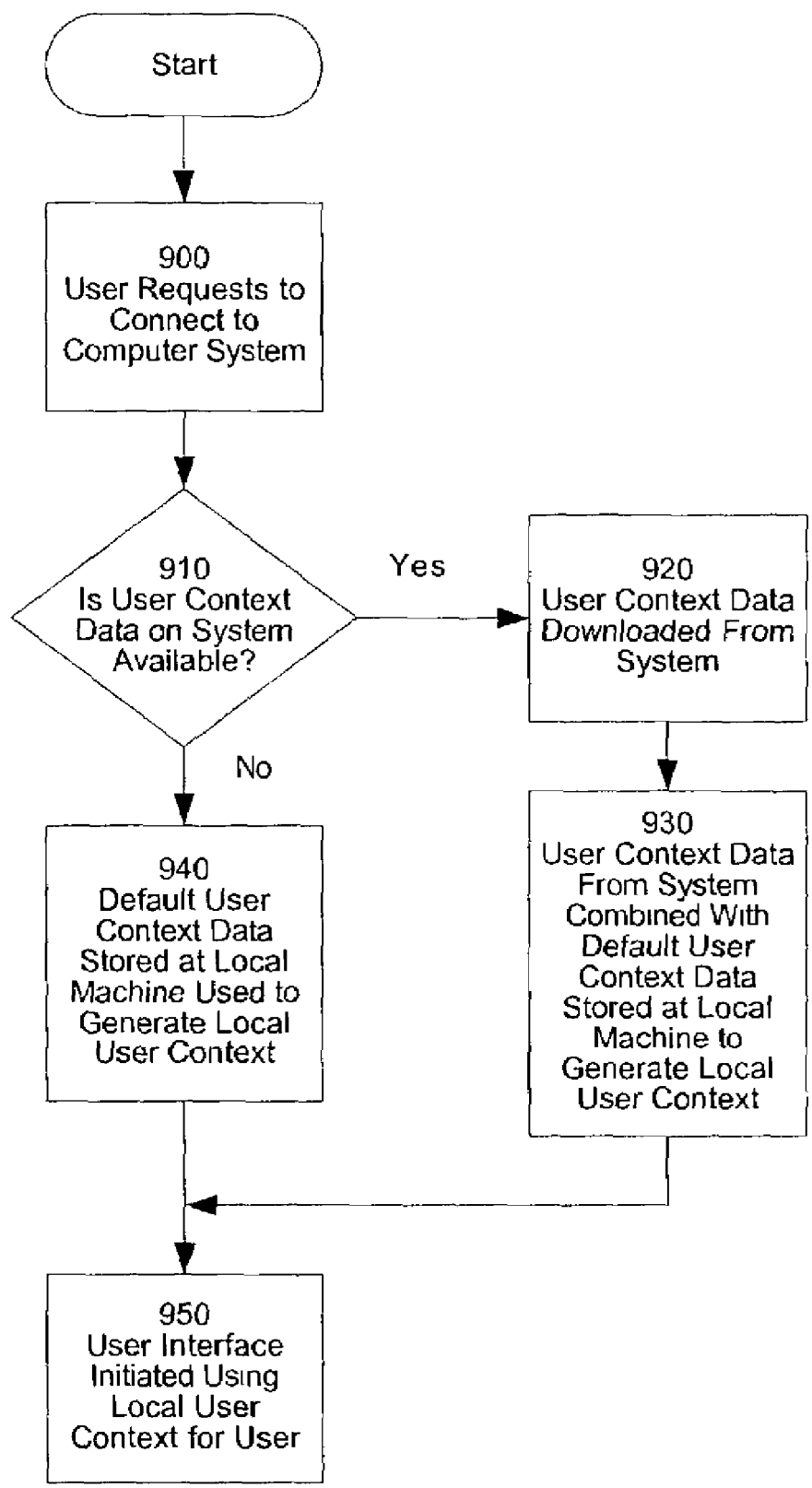
FIG. 9 is a flow diagram of the process of generating a local user context and initiating a user interface in accordance with one embodiment of the present invention.

FIG. 9 illustrates the process of generating a local user context and initiating a user interface in accordance with one embodiment of the present invention. At block 900, a user requests to connect to a computer system. At block 910, it is determined whether the user context data on the system is available. If the user context data on the system is available, user context data is downloaded from the system at block 920. At block 930, the user context data from the system is combined with default user context data stored at the local machine to generate a local user context and the process continues at block 950. If the user context data on the system is not available, the default user context data stored at the local machine is used to generate a local user context at block 940. The process then continues at block 950. At block 950, a user interface is initiated using the local user context for the user.

Altering User Contexts

Figure 10:
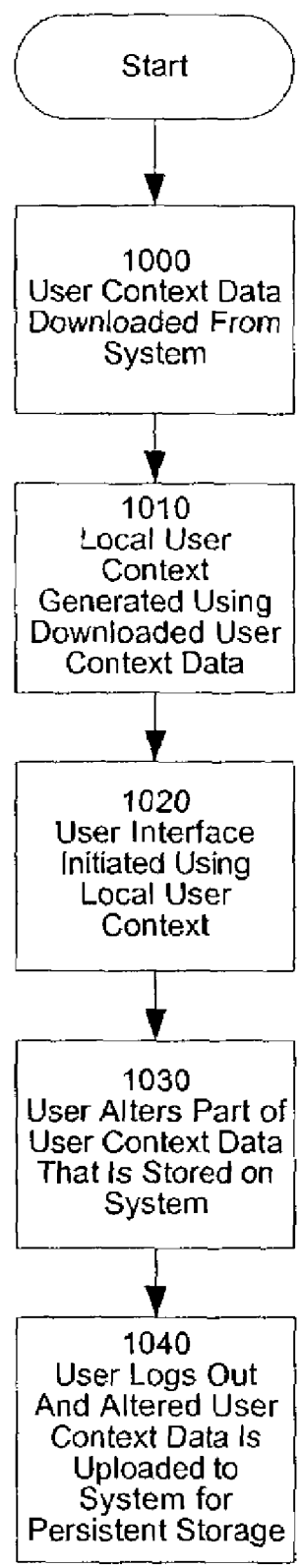
FIG. 10 is a flow diagram of the process of persistently altering user context data in accordance with one embodiment of the present invention.

In one embodiment, the user may persistently alter a portion of the user context data from the system. After the context data is altered, the altered data is uploaded to the system. FIG. 10 illustrates the process of persistently altering user context data in accordance with one embodiment of the present invention. At block 1000, user context data is downloaded from the system. At block 1010, a local user context is generated using the downloaded user context data.

At block 1020, a user interface is initiated using the local user context. At block 1030, the user alters part of the user context data that is stored on the system. At block 1040, the user logs out and the altered user context data is uploaded to the system for persistent storage.

In another embodiment, the user may temporarily alter a portion of the default user context data on the local machine. When the user stops using the system (e.g., logs out), the temporary alterations are lost and the default user context data is restored. In another embodiment, the user is prevented from altering some portions of the user context.

Figure 11:
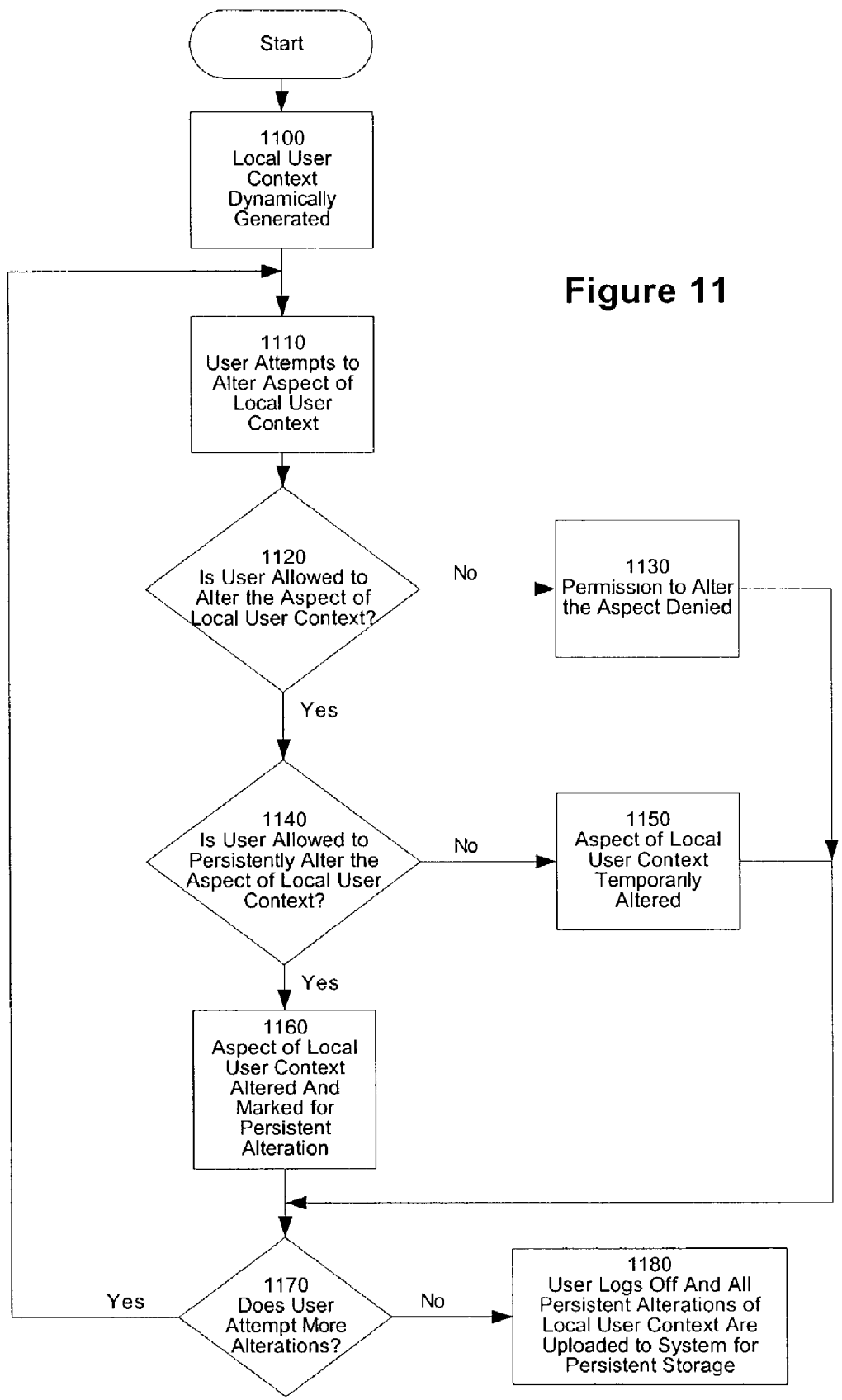
FIG. 11 is a flow diagram of the process of altering a user context in accordance with one embodiment of the present invention.

FIG. 11 illustrates the process of altering a user context in accordance with one embodiment of the present invention. At block 1100, a local user context is dynamically generated. At block 1110, a user attempts to alter an aspect of the local user context. At block 1120, it is determined whether the user is allowed to alter the aspect of the local user context. If the user is not allowed to alter the aspect of the local user context, the permission to alter the aspect is denied at block 1130 and the process continues at block 1170.

If the user is allowed to alter the aspect of the local user context, it is determined whether the user is allowed to persistently alter the aspect of the local user context at block 1140. If the user is not allowed to persistently alter the aspect of the local user context, the aspect of the local user context is temporarily altered at block 1150 and the process continues at block 1170. In one embodiment, aspects are temporarily altered by altering the aspect in memory, but not altering the aspect as it is stored on a persistent storage device. Thus, when a user logs out, all temporary changes are lost and the unchanged stored value is used in generating subsequent local user contexts.

If the user is allowed to persistently alter the aspect of the local user context, the aspect of the local user context is altered and marked for persistent alteration at block 1160. At block 1170, it is determined whether the user attempts more alterations. If the user attempts more alterations, the process repeats at block 1110. If the user does not attempt more alterations, the user logs off and all persistent alterations of the local user context are uploaded to the system for persistent storage at block 1180.

Web Browser Interface

In one embodiment, the user interface is a web browser (e.g., Netscape). The user displays standard web content using the web browser (e.g., HTML, JPEG, GIF, Java and Javascript). In one embodiment, the web browser is Netscape Navigator (e.g., Netscape Navigator 4.75) with only the browser enabled. In one embodiment, two configuration files (i.e., a global netscape.cfg and a preferences.js) are used to help generate the dynamic local user context. In one embodiment, the configuration file, preferences.js, is generated dynamically each time the browser is started.

In one embodiment, the user uses applets to adapt to changing needs. In one embodiment, the web browser initiates helper applications to perform specific tasks (e.g., scripting, Java virtual machine, image output, video output or audio output).

In one embodiment, documents in portable data format (PDF) are rendered using the Adobe Acrobat Reader (Acroread) as a helper function. In another embodiment, forms data format (FDF) files are rendered using Acroread as a helper function. In one embodiment, postscript documents (e.g., PS and EPS) are converted to PDF files using Ghostscript and are displayed using Acroread. In another embodiment, TIF and TIFF documents are displayed using a plug-in. In yet another embodiment, G3 documents are displayed using a plugin.

Multimedia Content

In other embodiments, multimedia content is handled by helpers or plugins. In one embodiment SMI files are displayed using RealPlayer (e.g., RealPlayer7). In another embodiment, SPL files are displayed using Macromedia Plugin. In yet another embodiment, SWF files are displayed using Macromedia Plugin. In various embodiments, Java Media Framework is used to display UA, SND, G728, G729, G729a, MID, MIDI, MP3, RMF, AIFF, AIF, GSM, WAV, MPEG, MGP, MPE, MPV, VBS, MPEGV, MOV, MPV2, MP2V, or AVI files.

In other embodiments, RealPlayer (e.g., RealPlayer7) is used to display RA, RM, RAM or M3U. In one embodiment, RealPlayer Plugin is used to display RPM files. In various embodiments, Java Plugin is used to handle different MIME types. For example, java bean, java applet and java vm are handled by Java Plugin.

Example of an Implementation

One embodiment of the invention is implemented in a computer system having a local machine and a data center server. The local machine includes an input/output unit or units (e.g., a "Human Interface Device" described below)

and a local box having a local server (e.g., a Sunray server). The input/output unit is for receiving and displaying data. The local box is for running the local server and a restricted run-time environment. The local server is for executing an interface, such as a browser, for the input/output unit or units. The data center server is for providing all other state maintenance and computation functions.

Figure 12:
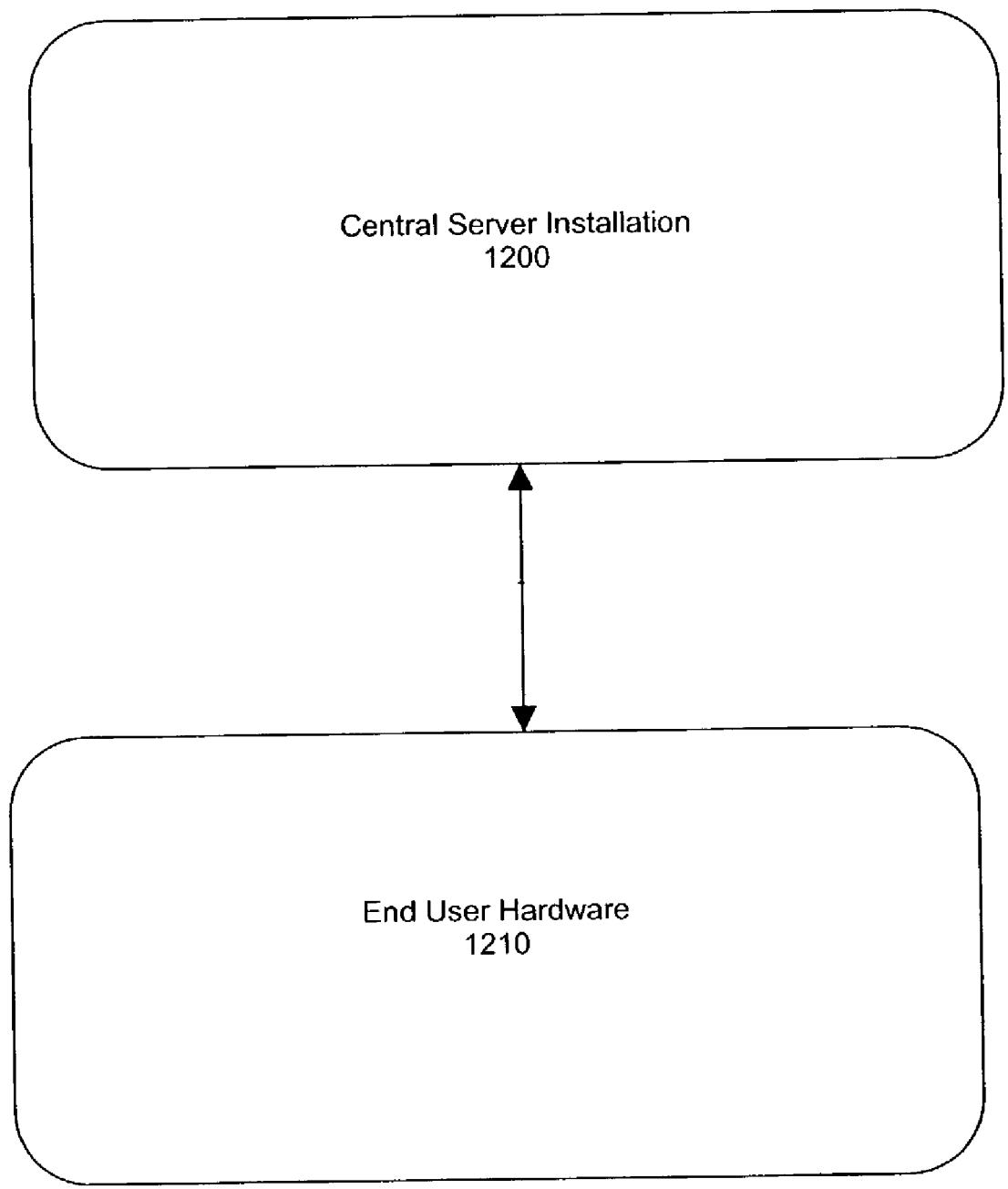
FIG. 12 is a block diagram of an example of a thin client topology called a virtual desktop system architecture in accordance with one embodiment of the present invention.

Moreover, an embodiment of the invention is used as part of a thin client architecture system. FIG. 12 shows an example of a thin client topology called a virtual desktop system architecture. The virtual desktop system architecture provides a re-partitioning of functionality between a central server installation 1200 and end user hardware 1210. Data and computational functionality are provided by data sources via a centralized processing arrangement. At the user end, all functionality is eliminated except that which generates output to the user (e.g., display and speakers) and takes input from the user (e.g., mouse and keyboard) or other peripherals with which the user may interact (e.g., scanners, cameras, removable storage, etc.). All computing is done by the central data source and the computing is done independently of the destination of the data being generated. The output of the source is provided to a terminal referred to here as a "Human Interface Device" (HID). The HID is capable of receiving and displaying the data.

Figure 13:
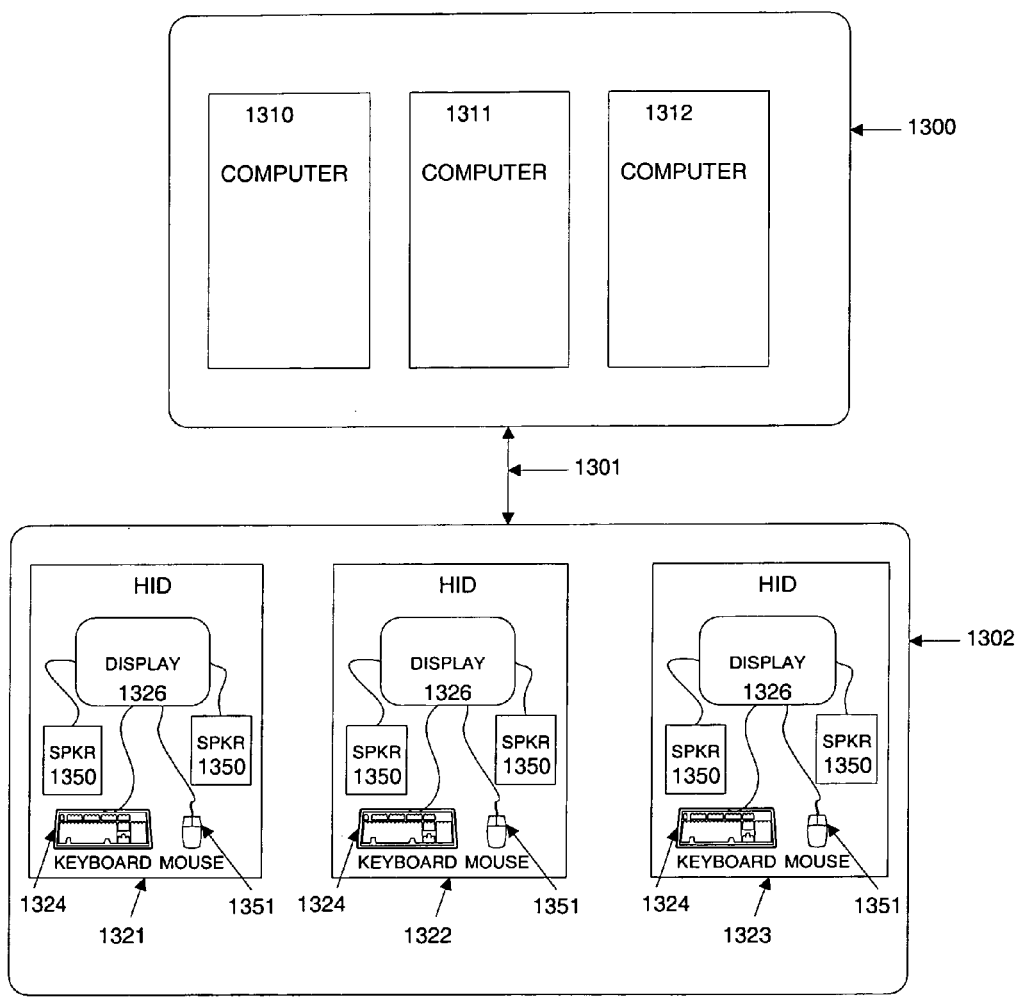
FIG. 13 is a block diagram of a system wherein one or more services communicate with one or more Human Input Devices (HIDs) through a communication link, such as a network in accordance with one embodiment of the present invention.

The functionality of the virtual desktop system is partitioned between a display and an input device, such as a remote system and associated display device, and data sources or services, such as a host system interconnected to the remote system via a communication link. The display and input device is a human interface device (HID). The system is partitioned such that state maintenance and computation functions have been removed from the HID and reside on data sources or services. One or more services communicate with one or more HIDs through a communication link, such as a network. An example of such a system is illustrated in FIG. 13 wherein the system comprises computational service providers 1300 communicating data through communication link 1301 to HIDs 1302.

The computational power and state maintenance are provided by the service providers or services. The services are not tied to a specific computer, but may be distributed over one or more traditional desktop systems, such as described in connection with FIG. 13, or with traditional servers. One computer may have one or more services and a service may be implemented by one or more computers. The service provides computation, state and data (i.e., state maintenance) to HIDs and the service is under the control of a common authority or manager. In FIG. 13, the services are provided by computers 1310, 1311, and 1312. In addition to the services, a central data source can provide data to the HIDs from an external source, such as, for example, the Internet or World Wide Web. The data source also can be broadcast entities, such as those that broadcast data (e.g., television and radio signals).

Examples of services include, among others, X11/Unix services, archived or live audio or video services, Windows NT service, and Java™ program execution service. A service herein is a process that provides output data and response to user requests and input. The service handles communication with an HID currently used by a user to access the service. This includes taking the output from the computational service and converting it to a standard protocol for the HID. The data protocol conversion is handled by a middleware layer, such as the X11 server, the Microsoft Windows interface, video format transcoder, the OpenGL® interface, or a variant of the java.awt.graphics class, within the service producer machine. The service machine handles the translation to and from a virtual desktop architecture wire protocol described further below.

Each service is provided by a computing device optimized for its performance. For example, an Enterprise class machine (e.g., a data center server, a multi-CPU server, and/or a Sun E4500 server) could be used to provide X11/Unix service, a Sun MediaCenter™ could be used to provide video service, and a Hydra based NT machine could provide applet program execution services.

The service providing computer system can connect directly to the HIDs through the interconnect fabric. It is also possible for the service producer to be a proxy for another device providing the computational service, such as a database computer in a three-tier architecture, where the proxy computer might only generate queries and execute user interface code.

The interconnect fabric can comprise any of multiple, suitable communication paths for carrying data between the services and the HIDs. In one embodiment the interconnect fabric is a local area network implemented as an Ethernet network. Any other local network may also be utilized. The invention also contemplates the use of wide area networks, the Internet, the World Wide Web, and others. The interconnect fabric may be implemented with a physical medium, such as a wire or fiber optic cable, or it may be implemented in a wireless environment.

The interconnect fabric provides actively managed, low-latent, high-bandwidth communication between the HID and the services being accessed. One embodiment contemplates a single-level, switched network with cooperative (as opposed to completing) network traffic. Dedicated or shared communication interconnects may be used in the present invention.

The HID is the means by which users access the computational services provided by the services. FIG. 13 illustrates HIDs 1321, 1322 and 1323. Each HID comprises a display 1326, a keyboard 1324, a mouse 1351, and audio speakers 1350. The HID includes the electronics needed to interface these devices to the interconnection fabric and to transmit to and receive data from the services.

Figure 14:
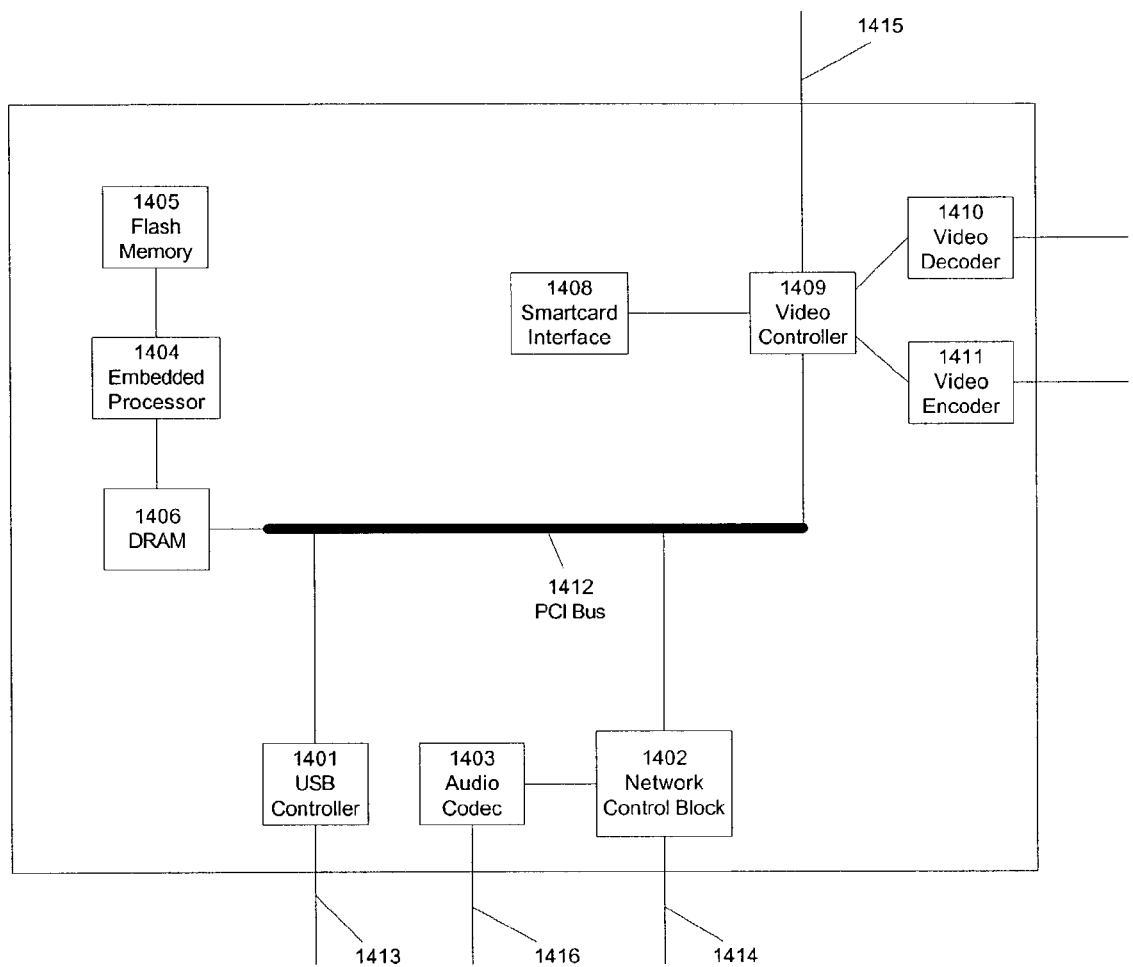
FIG. 14 is a block diagram of an example embodiment of the HID in accordance with one embodiment of the present invention.

A block diagram of an example embodiment of the HID is illustrated in FIG. 14. The components of the HID are coupled internally to a PCI bus 1412. Network control block 1402 communicates to the interconnect fabric, such as an Ethernet, through line 1414. An audio codec 1403 receives audio data on interface 1416 and is coupled to network control block 1402. USB data communication is provided on lines 1413 to a USB controller 1401. The HID further comprises an embedded processor 1404 such as a Sparc2ep with coupled flash memory 1405 and DRAM 1406. The USB controller 1401, the network control block 1402 and the embedded processor 1404 are all coupled to the PCI bus 1412. A video controller 1409, also coupled to the PCI bus 1412, can include an ATI RagePro+ frame buffer controller, which provides SVGA output on the line 1415. NTSC data is provided in and out of the video controller through video decoder 1410 and encoder 1411, respectively. A smartcard interface 1408 may also be coupled to the video controller 1409.

Figure 15:
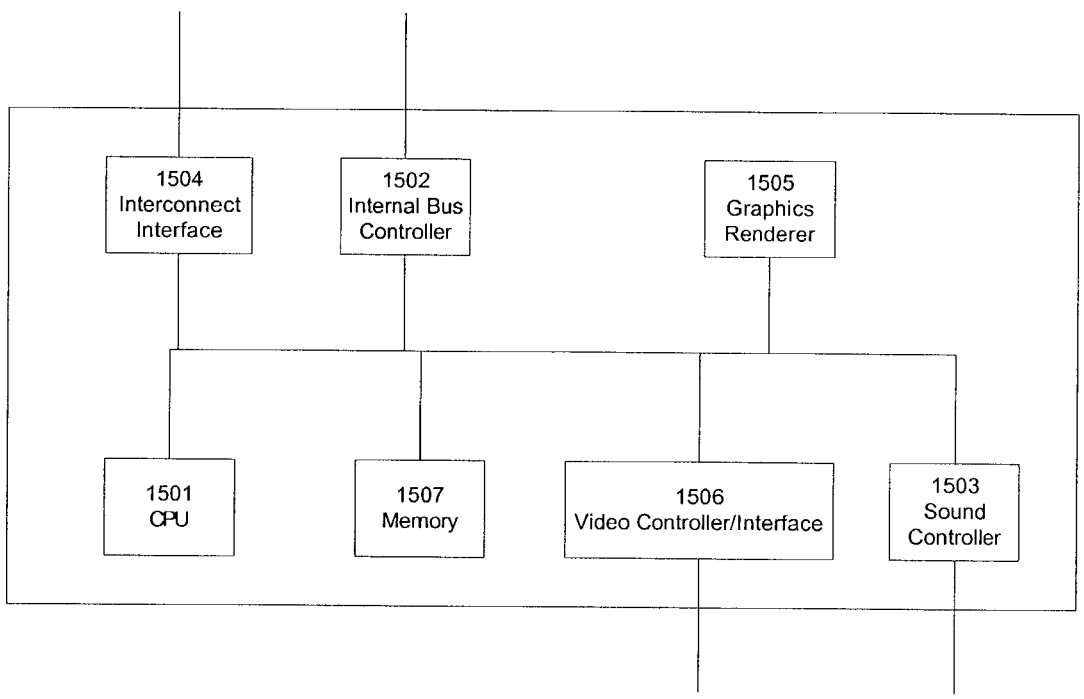
FIG. 15 is a block diagram of a single chip implementation of an HID in accordance with one embodiment of the present invention.

Alternatively, the HID can comprise a single chip implementation, as illustrated in FIG. 15. The single chip includes the necessary processing capability implemented via CPU 1501 and graphics renderer 1505. Chip memory 1507 is provided along with video controller/interface 1506. An internal bus (USB) controller 1502 is provided to permit communication to a mouse, a keyboard and other local devices attached to the HID. A sound controller 1503 and an interconnect interface 1504 are also provided. The video interface shares memory 1507 with the CPU 1501 and graphics renderer 1505. The software used in this embodiment may reside locally in on-volatile memory or it can be loaded through the interconnection interface when the device is powered.

Thus, a method and apparatus for restricted run-time environment with dynamic user context is described in conjunction with one or more specific embodiments. The invention is defined by the following claims and their full scope and equivalents.

The invention claimed is:

1. A method for interfacing with a computer system comprising:
   providing a restricted run-time environment on the computer system, the computer-system includes a first set of system files, the restricted run-time environment includes a second set of system files, wherein the second set of system files is accessible from an application performing processes in the restricted run-time environment;
   generating a selected one of a plurality of available local user contexts dynamically for use with said restricted run-time environment while said restricted run-time environment is being used, wherein the plurality of available local user contexts are stored on the computer system and the selected local user context is downloaded from the computer system to the restricted run-time environment; and
   isolating the first set of system files on the computer system from said restricted run-time environment.

2. The method of claim 1, wherein said step of providing further comprises running a user interface in said restricted run-time environment.

3. The method of claim 2, wherein said step of providing further comprises running a process spawned by said user interface in said restricted run-time environment.

4. The method of claim 3, wherein said restricted run-time environment comprises a chroot environment.

5. The method of claim 1, wherein said step of generating comprises:
   providing a set of default user context data; incorporating said set of default user context data in said local user context;
   altering said set of default user context data temporarily; and
   restoring said set of default user context data.

6. The method of claim 1, wherein said step of generating comprises:
   downloading a set of persistent user context data; and
   incorporating said set of persistent user context data in said local user context.

7. The method of claim 6, wherein said step of generating further comprises:
   altering said set of persistent user context data;
   uploading said set of persistent user context data; and
   storing said set of persistent user context data persistently.

8. A computer system interface comprising:
   a server;
   a local machine connected with said server, the local machine includes a first set of system files;
   a run-time environment provider for providing a restricted run-time environment in said local machine, the restricted run-time environment includes a second set of system files, wherein the second set of system files is accessible from an application performing processes in the restricted run-time environment the restricted run-time environment also includes an isolation unit for isolating the first set of system files from the restricted run-time environment; and
   a context generator for providing a selected one of a plurality of available local user contexts dynamically for use with said restricted run-time environment, while said restricted run-time environment is being used, wherein the plurality of available local user contexts are stored on the computer system and the selected local user context is downloaded from the computer system to the restricted run-time environment.

9. The computer system interface of claim 8, wherein said restricted run-time environment comprises a chroot environment and wherein said run-time environment provider comprises an execution system for running a user interface in said chroot environment.

10. The computer system interface of claim 9, wherein said chroot environment comprises a protection scheme having a plurality of levels.

11. The computer system interface of claim 10, wherein said plurality of levels comprises a first level for initiating a user, a second level for initiating a user application, and a third level for operating said user application.

12. The computer system interface of claim 11, wherein said first level can be executed using a root permission, said second level can be executed using a user specific permission, and said third level can be executed using an application specific permission.

13. The computer system interface of claim 9, wherein said run-time environment provider further comprises a second execution system for running a process spawned by said user interface in said chroot environment.

14. The computer system interface of claim 9, wherein said user interface is a web browser.

15. The computer system interface of claim 14, further comprising a display unit for displaying a standard world wide web file using said web browser.

16. The computer system interface of claim 15, further comprising a second display unit for displaying a non-standard file using a plugin for said web browser.

17. The computer system interface of claim 15, further comprising a second display unit for displaying a non-standard file using a helper application for said web browser.

18. The computer system interface of claim 8, wherein said context generator comprises:
   a data provider for providing a set of default user context data;
   an incorporation unit incorporating said set of default user context data in said local user context;
   an alteration unit for altering said set of default user context data temporarily; and
   a restoration unit for restoring said set of default user context data.

19. The computer system interface of claim 8, wherein said context generator comprises:
   a downloading system for downloading a set of persistent user context data; and
   an incorporation unit for incorporating said set of persistent user context data in said local user context.

20. The computer system interface of claim 19, wherein said context generator further comprises:
   an alteration unit for altering said set of persistent user context data;
   an uploading system for uploading said set of persistent user context data; and a storage unit for storing continually said set of persistent user context data.

21. The computer system interface of claim 8, wherein said server, said local machine, said run-time environment provider, and said context generator are configured using a computer readable program code.

22. A computer system comprising:
a network;
a first server for providing state and computational services;
a client connected with said first server via said network;
a first set of system files included in said first server;
a restricted run-time environment isolated from said first set of system files wherein said restricted run-time environment are located within said client and wherein said restricted run-time environment includes a second set of system files, wherein said second set of system files is accessible from an application performing processes in the restricted run-time environment, said restricted run-time environment is isolated from said first set of system files;
a selected one of a plurality of local user contexts dynamically configured to be used with said restricted run-time environment, while said restricted run-time environment is being used, wherein the plurality of available local user contexts are stored on the computer system and the selected local user context is downloaded from the computer system to the restricted run-time environment; and
a user interface initiated using said local user context.

23. The computer system of claim 22, wherein said client comprises a second server connected with said client, wherein said second server executes said user interface in said restricted run-time environment, and wherein said client is connected with said network via said second server.

24. The computer system of claim 23, further comprising:
a set of default user context data stored within said client;
wherein said set of default user context data are used for configuring said local user context; and
wherein said set of default user context data can be altered temporally.

25. The computer system of claim 23, further comprising:
a set of persistent user context data stored within said first server;
wherein said set of persistent user context data are downloaded from said first server to said client via said network and are used for configuring said local user context; and
wherein said set of persistent user context data can be altered permanently.

26. The computer system of claim 23, further comprising:
a set of default user context data stored within said client; and
a set of persistent user context data stored within said first server;
wherein said set of default user context data and said set of persistent user context data are used for configuring said local user context;
wherein said set of default user context data can be altered temporally; and
wherein said set of persistent user context data can be altered permanently.

* * * * *